(No Model.) 2 Sheets—Sheet 1.

J. L. McCALL.
Seeding Machine.

No. 229,439. Patented June 29, 1880.

WITNESSES:
Jas. E. Hitchinson.
J. A. Rutherford

INVENTOR
Jno. L. McCall,
by James L. Norris.
Att'y.

(No Model.) 2 Sheets—Sheet 2.

J. L. McCALL.
Seeding Machine.

No: 229,439. Patented June 29, 1880.

WITNESSES:
Jas. E. Hutchinson.
J. A. Rutherford

INVENTOR
Jno. L. McCall,
by James L. Norris.
Att'y.

UNITED STATES PATENT OFFICE.

JOHN L. McCALL, OF GEORGETOWN, ASSIGNOR OF ONE-HALF OF HIS RIGHT TO P. H. GERHARD, OF AUSTIN, TEXAS.

SEEDING-MACHINE.

SPECIFICATION forming part of Letters Patent No. 229,439, dated June 29, 1880.

Application filed April 6, 1880. (No model.)

*To all whom it may concern:*

Be it known that I, JOHN L. McCALL, a citizen of the United States, residing at Georgetown, in the county of Williamson and State of Texas, have invented new and useful Improvements in Seeding-Machines, of which the following is a specification.

This invention relates to an improvement in light-draft interchangeable seeding-machines, its object being to provide a machine of this class which can be readily converted from a cotton-planter to a corn-planter, and vice versa, and which is compact, simple, and durable.

Figure 1:
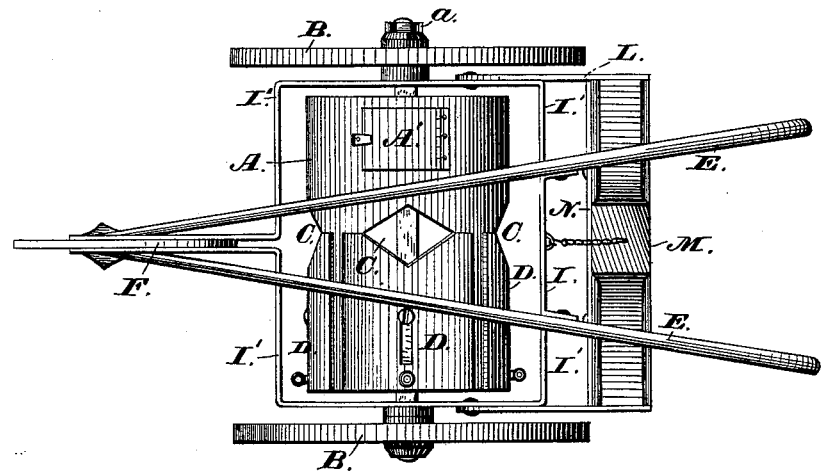
Figure 2:
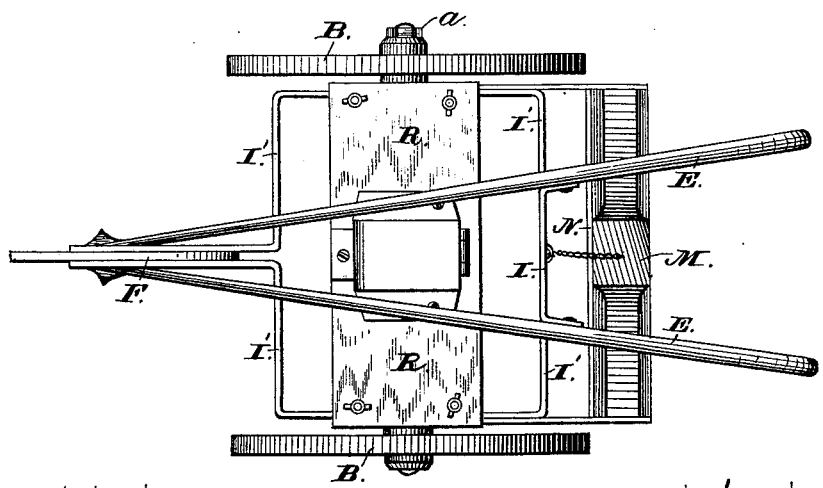
Figure 3:
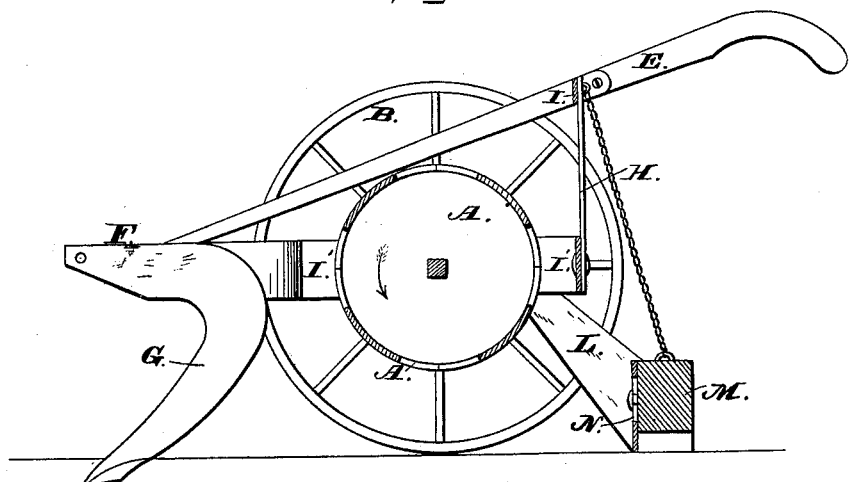
Figure 4:
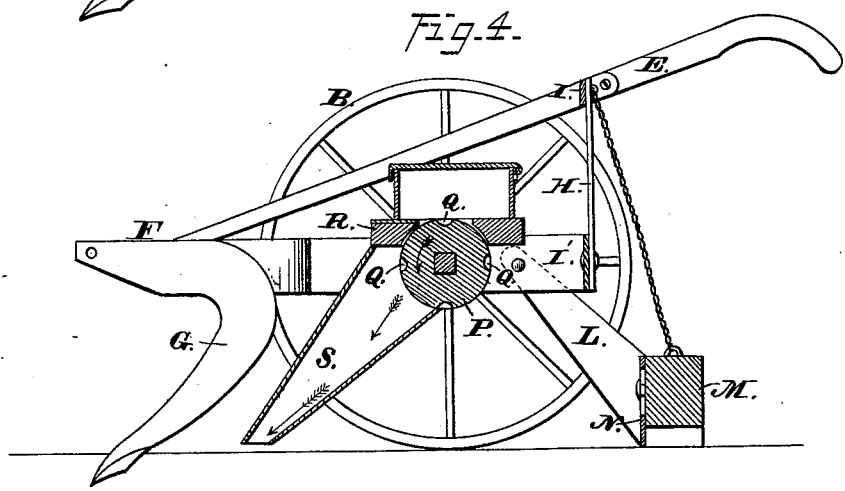

In the drawings, Figure 1 is a top or plan view of the machine with the cotton-seed-distributing drum connected therewith. Fig. 2 is a like view of the machine converted into a corn-planter. Fig. 3 is a longitudinal vertical section of the machine converted into a cotton-planter. Fig. 4 is a similar view of the machine arranged as a corn-planter.

The cylindrical seed-drum A rotates with the axle of the supporting and driving wheels B, so as to distribute the cotton-seed through the discharge-openings C, which are arranged as usual in a central line around the drum. The area of the discharge-openings is determined by a series of independent slides, D, which can be adjusted on the drum, and which are each capable of a lateral adjustment thereon in order to decrease or increase the size of each or every alternate seed-opening for planting the seed in hills or drills, which is very requisite in certain kinds of seed. The drum is provided with the hinged door A', which will be opened for the introduction of seed into the drum, as usual.

The handles E, which are arranged above the seed-distributer, are secured at their forward ends to the plow-beam F, and the plow-beam is adapted to receive the upper end of the standard of the plow or opener G, which forms the furrow in advance of the seed-drum or corn-planting apparatus presently described. As a means for effectively supporting the handles in their inclined position, a bar, H, is extended from a cross-bar, I, between the handles, down to a rectangular frame, I', which is supported upon the axle, and which is bolted to the plow-beam. To said frame are hinged the bars L L at points in rear of the axle, these bars connecting at their lower ends with the drag M, which is provided with a vertically-adjustable plate, N, for effectively covering up the seed.

The frame I' is rectangular in shape, and constitutes a simple and an efficient means for securing the beam for holding the bars of the drag in suspension and for supporting the vertical bar, which supports the handles. A further use of this frame is to furnish a support for a board, which carries a hopper especially provided for a corn-planting device, which is interchangeable with the cotton or other seed-distributing cylinder just described.

The corn-planting device consists of a wheel, P, having a number of holes, Q, in its face, each hole being of a size to receive a kernel of corn.

For corn-planting this wheel is to be arranged upon the axle so as to rotate therewith, and to the rectangular frame I' is secured by any suitable clasps or clamps a board, R, having a centrally-located opening to receive a portion of the wheel P. The hopper is arranged over the opening of the board R, and the corn being placed in the hopper the kernels will drop into the holes of the wheel as said holes are presented in position to receive them. The rotation of the wheel carries the corn forward and drops it at intervals into a removable or detachable discharge-spout, S, through which it is conducted and dropped at intervals in rear of the furrow-opener.

In order to effect such interchangement of parts one of the supporting and driving wheels is held rigidly upon the axle by a screw-nut, *a*, which when screwed up binds the hub of the wheel against a washer arranged upon the axle between the wheel-hub and the side of the main frame. To remove the seed-drum the nut will be unscrewed from the axle, and the axle withdrawn from this wheel and from the seed-drum by drawing the opposite wheel, which is fast upon the axle, away from the machine. After removing the drum from its position in the main frame, and during the operation of replacing the axle in connection with the main frame and the said disconnected wheel, the axle will be passed through the corn-planting wheel. The cross-board bearing the hopper will be mounted upon the main frame, after which the machine will be ready to serve effectively as a corn-planter.

After subserving the purpose as a corn-planter the axle can be withdrawn from the corn-planter wheel in the same manner in which it was withdrawn from the seed-distributing drum, and the said drum be connected with the machine as before.

This interchangeability of devices is effected in ready, simple, and convenient way; and it will be noticed that the rectangular main frame requires no special adaptation for such change, the axle in both cases passing through its side in the same manner.

I do not claim, broadly, a cylindrical seed-drum rotating with an axle arranged in supporting and driving wheels. Nor do I claim, broadly, a disk or wheel revolving with an axle and having peripheral recesses for receiving grains of corn from a hopper carried by the frame of the machine and discharging the grains into a seed-conveying spout, as such of themselves are not my invention; but,

Having thus described my invention, what I claim, and desire to secure by Letters Patent, is—

In a seeding-machine, the rectangular frame provided with the removable and replaceable axle, the projecting ends of which carry the driving-wheels, the said axle being adapted to pass through either the interchangeable cylindrical seed-drum A or the seed-dropping wheel P, and support either of the same within the rectangular frame, and the upper edge of the said frame being adapted to receive and support the removable and replaceable board or platform R, which carries the seed-hopper, and is centrally slotted for the passage of the seed-dropping wheel, the whole being constructed as herein shown and described, whereby the drum and the seed-wheel and hopper carrying board or platform may be readily interchanged for converting the machine into a cotton or corn planter, as set forth.

In testimony whereof I have hereunto set my hand and seal in the presence of two subscribing witnesses.

JNO. L. McCALL. [L. S.]

Witnesses:
S. F. WINSTON,
ALEX. M. JACKSON, Jr.